R. S. CLAYTON.
ELECTRIC SIGNALING CIRCUIT CLOSING ALARM.
APPLICATION FILED JAN. 28, 1915.
1,265,428.
Patented May 7, 1918.
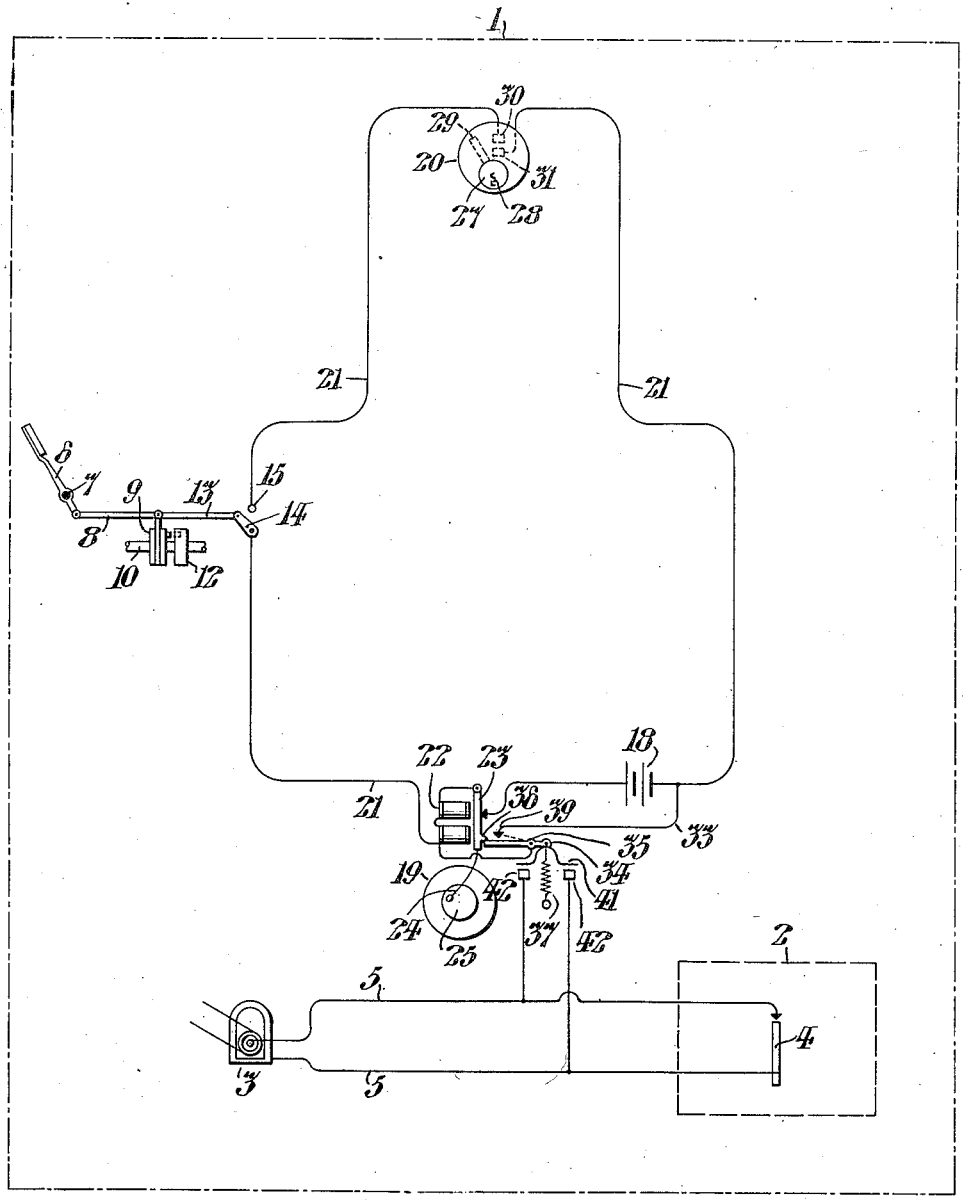
WITNESSES:
INVENTOR:

UNITED STATES PATENT OFFICE.

RALPH SHERWOOD CLAYTON, OF PHILADELPHIA, PENNSYLVANIA, ASSIGNOR OF ONE-HALF TO JOHN VAN NEST McHOSE, OF PHILADELPHIA, PENNSYLVANIA.

ELECTRIC SIGNALING CIRCUIT-CLOSING ALARM.

1,265,428.  Specification of Letters Patent.  Patented May 7, 1918.

Application filed January 28, 1915. Serial No. 4,948.

*To all whom it may concern:*

Be it known that I, RALPH SHERWOOD CLAYTON, a citizen of the United States, residing at Philadelphia, in the State of Pennsylvania, have invented a certain new and useful Improvement in Electric Signaling Circuit-Closing Alarms, whereof the following is a specification, reference being had to the accompanying drawing.

My invention is particularly designed for embodiment in an automobile or other self-propelled vehicle to prevent unauthorized use thereof and sound an alarm when said use is attempted. However, I do not desire to limit my invention to such embodiment.

As hereinafter described, my invention may be embodied in an electric circuit including an electric generator, an audible alarm, a key controlled switch and a switch coöperatively connected with the clutch lever by which the internal combustion motor of an automobile may be connected to operate the latter; so that, when said key controlled switch is closed, movement of said clutch lever to operate the vehicle closes the circuit which sounds the alarm, which may be a bell mounted in the automobile horn so that its sound is amplified by the latter. Moreover, a shunt of said circuit includes a switch constructed and arranged to be tripped by the operation of the audible alarm, to establish a circuit including said generator and said alarm so that the latter shall be continuously operated until said trip switch is manually reopened. Furthermore, said trip switch is coöperatively connected with switch means constructed and arranged to automatically bridge and short circuit the ignition circuit of the vehicle motor and thus prevent the operation of said motor until said trip switch is manually reset.

In the most complex form of my invention, above contemplated, any attempt to use the structure which is safeguarded by my invention, not only causes an audible alarm to be sounded, but causes it to be continuously sounded even if the part of the structure moved is restored to its original position, and said structure is simultaneously rendered inoperative, until the elements of my invention are manually reset. It is to be understood that all of the elements of my invention may be concealed, or secluded in a lockable casing so that they cannot be tampered with.

Although I find it convenient to coöperatively connect my invention with the clutch lever, as aforesaid; it is to be understood that it may be used in conjunction with any movable element of a structure which my invention is intended to safeguard, and my invention includes the various novel features of construction and arrangement hereinafter more definitely specified and claimed.

The drawing merely shows a wiring diagram of the most complex typical embodiment of my invention above contemplated.

All of the elements shown in said drawing are mounted upon and carried by an automobile, indicated by the line 1, including an internal combustion engine, indicated at 2, having an electric ignition circuit including the magneto 3, or other suitable generator, and the spark plug 4, connected by the wires 5. Said automobile includes the clutch lever 6 which is fulcrumed at 7 and connected by the link 8 with the movable clutch member 9 on the automobile gearing shaft 10 provided with the complementary clutch member 12; whereby, said engine may, normally, be connected to operate the automobile. Said clutch lever is connected by the link 13 with the switch 14, arranged to contact with the terminal 15 to close the alarm circuit when said lever is shifted to cause the engine to operate the automobile. My electric alarm circuit includes the generator 18, the audible alarm 19, and the key controlled switch 20, connected by the wires 21. Said audible alarm is conveniently a vibratory bell structure, comprising the coils 22, armature 23, hammer 24 and bell 25. Said key controlled switch is conveniently of the "Yale" type including the rotary barrel 27, having the key slot 28, carrying the switch lever 29 adapted to connect the terminals 30 and 31; said key controlled switch being manually operative to close the alarm circuit thereat and prevent its being reopened except by the use of the proper key.

A shunt of said alarm circuit includes the wire 33, and a switch constructed and arranged to be tripped by the operation of said audible alarm to establish a circuit including said generator and said alarm, whereby the latter is continuously operated until said trip switch is manually reopened. Said trip switch includes the lever 34 which is fulcrumed at 35 and normally held against the stop lug 36 on said armature 23, by the spring 37; so that when said armature is shifted toward the coils 22, said lever 34 is tripped and swung into contact with the terminal 39, thus closing the shunt circuit, so that the audible alarm continues to sound whether said clutch lever is restored to its original position or not.

Said trip switch lever 34 carries switch means, including the spring contact bridge 41 arranged to connect the terminals 42, to bridge and thus automatically short circuit said ignition circuit when said audible alarm is operated as above described; whereby, movement of said clutch lever 6 when said key controlled switch 20 is closed, automatically sounds an audible alarm, establishes a circuit by which said alarm is continuously caused to sound, and renders said engine inoperative, so that the movement of said clutch lever is rendered ineffective.

Of course, the normal position of the apparatus is that shown in the drawing, wherein the key switch 20 is open and the ignition circuit unbridged and, in such position of the apparatus, movement of the clutch lever has none of the effect upon the alarm circuit above contemplated, but merely connects the engine to operate the autotmobile in the usual manner.

Although I have shown my invention employed to safeguard an automobile; it is obvious that it may be otherwise employed. Therefore, I do not desire to limit myself to the precise details of construction and arrangement herein set forth as it is obvious that various modifications may be made therein without departing from the essential features of my invention as defined in the appended claims.

I claim:—

1. In an electric signaling circuit closing alarm for an automobile; the combination with an internal combustion engine having an electric ignition circuit and a clutch lever whereby said engine may, normally, be connected to operate the automobile; of an electric circuit including an electric generator, an audible alarm and a key controlled switch; of a switch coöperatively connected with said clutch lever, so constructed and arranged that, when said key controlled switch is closed, movement of said clutch lever to operate the automobile closes the circuit which sounds the alarm; a shunt of said circuit including a switch constructed and arranged to be tripped by the operation of said audible alarm to establish a circuit including said generator and said alarm, whereby the latter is continuously operated until said trip switch is manually reopened; and switch means coöperatively connected with said trip switch, constructed and arranged to automatically bridge and short circuit said ignition circuit; whereby, movement of said clutch lever, when said key controlled switch is closed, automatically sounds an audible alarm, establishes a circuit by which said alarm is continuously caused to sound, whether the clutch lever is restored to its original position or not, and renders said motor inoperative, so that the movement of said clutch lever is rendered ineffective.

2. The combination with an internal combustion engine having an electric ignition circuit and a lever whereby said engine may, normally, be caused to operate; of an electric circuit including an electric generator, an audible alarm and a key controlled switch; a switch coöperatively connected with said lever, so constructed and arranged that, when said key controlled switch is closed, movement of said lever to operate the engine closes the circuit which sounds the alarm; a shunt of said circuit including a switch constructed and arranged to be tripped by the operation of said audible alarm to establish a circuit including said generator and said alarm, whereby the latter is continuously operated until said trip switch is manually reopened; and switch means coöperatively connected with said trip switch, constructed and arranged to automatically bridge and short circuit said ignition circuit; whereby, movement of said lever, when said key controlled switch is closed, automatically sounds an audible alarm, establishes a circuit by which said alarm is continuously caused to sound, and renders said engine inoperative, so that the movement of said lever is rendered ineffective.

3. The combination with an internal combustion engine having an electric ignition circuit and a lever whereby said engine may, normally, be caused to operate; of an electric circuit including an electric generator, an audible alarm and a manually controlled switch; of a switch coöperatively connected with said lever, so constructed and arranged that, when said manually controlled switch is closed, movement of said lever to operate the engine closes the circuit which sounds the alarm; a shunt of said circuit including a switch constructed and arranged to be tripped by the operation of said audible alarm to establish a circuit including said generator and said alarm, whereby the latter is continuously operated until said trip switch is manually reopened; and switch means coöperatively connected with said trip switch, constructed and arranged to automatically bridge and short circuit said ignition circuit; whereby, movement of said lever, when said key controlled switch is closed, automatically sounds an audible alarm, establishes a circuit by which said alarm is continuously caused to sound and renders said engine inoperative, so that the movement of said lever is rendered ineffective.

4. The combination with an internal combustion engine having an electric ignition circuit and a movable element which must be moved to operate the engine; of an electric circuit including an electric generator, an audible alarm and a key controlled switch; a switch coöperatively connected with said movable element, so constructed and arranged that, when said key controlled switch is closed, movement of said movable element to operate the engine closes the circuit which sounds the alarm; a shunt of said circuit including a switch constructed and arranged to be tripped by the operation of said audible alarm to establish a circuit including said generator and said alarm, whereby the latter is continuously operated until said trip switch is manually reopened; and switch means coöperatively connected with said trip switch, constructed and arranged to automatically bridge and short circuit said ignition circuit.

5. The combination with an internal combustion engine having an electric ignition circuit and a movable element which must be moved to operate the engine; of an electric circuit including an electric generator, an audible alarm and a manually controlled switch; a switch coöperatively connected with said movable element, so constructed and arranged that, when said key controlled switch is closed, movement of said movable element to operate the engine closes the circuit which sounds the alarm; and a trip switch, arranged to be tripped by the operation of said audible alarm, constructed and arranged to automatically bridge and short circuit said ignition circuit.

6. The combination with an internal combustion engine having a movable element which must be moved to operate the engine; of an electric circuit including an electric generator, an audible alarm and a manually controlled switch; means arranged to lock said switch in closed position; a switch coöperatively connected with said movable element, so constructed and arranged that, when said manually controlled switch is closed, movement of said movable element to operate the engine closes the circuit which sounds the alarm; and a shunt of said circuit including a switch constructed and arranged to be tripped by the operation of said audible alarm to establish a circuit including said generator and said alarm, whereby the latter is continuously operated until said trip switch is manually reopened.

7. The combination with an internal combustion engine having a movable element which must be moved to operate the engine; of an electric circuit including an electric generator, an audible alarm and a key controlled switch; means arranged to lock said switch in closed position; a switch coöperatively connected with said movable element, so constructed and arranged that, when said key controlled switch is closed, movement of said movable element closes the circuit which sounds the alarm; and a shunt of said circuit including a switch constructed and arranged to be tripped by the operation of said audible alarm to establish a circuit including said generator and said alarm, whereby the latter is continuously operated until said trip switch is manually reopened.

8. The combination with an internal combustion engine having a movable element which must be moved to operate the engine; of an electric circuit including an electric generator, an audible alarm and a key controlled switch; means arranged to lock said switch in closed position; a switch coöperatively connected with said movable element, so constructed and arranged that, when said key controlled switch is closed, movement of said movable element closes the circuit which sounds the alarm; and means arranged to be tripped by the operation of said audible alarm to establish a circuit including said generator and said alarm, whereby the latter is continuously operated until said trip switch is manually reopened.

In testimony whereof, I have hereunto signed my name at Philadelphia, Pennsylvania, this twenty-sixth day of January, 1915.

RALPH SHERWOOD CLAYTON.

Witnesses:
   Chas. F. Dengler,
   Carl H. Koch.